United States Patent [19]

Raj et al.

[11] Patent Number: 4,604,229
[45] Date of Patent: Aug. 5, 1986

[54] ELECTRICALLY CONDUCTIVE FERROFLUID COMPOSITIONS AND METHOD OF PREPARING AND USING SAME

[75] Inventors: Kuldip Raj, Merrimack; Lucian Borduz; Hanumaiah L. Gowda, both of Nashua, all of N.H.

[73] Assignee: Ferrofluidics Corporation, Nashua, N.H.

[21] Appl. No.: 713,757

[22] Filed: Mar. 20, 1985

[51] Int. Cl.$^4$ .............................................. H01B 1/06
[52] U.S. Cl. ................................... 252/510; 252/503; 252/506; 252/511; 252/516; 252/62.51; 252/62.52; 252/62.55; 252/62.56; 252/62.53; 252/62.54
[58] Field of Search ............... 252/511, 513, 512, 518, 252/519, 502, 503, 506, 504, 516, 62.51, 62.53, 62.54, 62.59, 62.55, 62.6, 62.56, 62.64; 524/431, 432, 435, 440

[56] References Cited

U.S. PATENT DOCUMENTS 3,764,540 10/1973 Khalafalla et al. ............... 252/62.55
4,430,239 2/1984 Wyman ............................ 252/62.51
4,469,624 9/1984 Ueda et al. .......................... 252/513

*Primary Examiner*—Josephine L. Barr
*Attorney, Agent, or Firm*—Richard P. Crowley

[57] ABSTRACT

An electrically conductive ferrofluid composition and a method of preparing and using the ferrofluid composition in a ferrofluid seal apparatus, and which ferrofluid composition comprises a liquid carrier having a colloidal dispersion of ferromagnetic particles in an amount sufficient to provide magnetic properties to the ferrofluid composition and carbon particles in an amount sufficient to provide electrical conductive properties to the ferrofluid composition, the ferromagnetic and carbon particles stabilized in the ferrofluid composition by a surface active dispersing agent. The electrically conductive ferrofluid composition is usefully employed in a ferrofluid exclusion seal apparatus to provide an electrically conductive seal apparatus particularly useful for computer disk drives and sputtering apparatus in the semiconductive industry.

24 Claims, 1 Drawing Figure

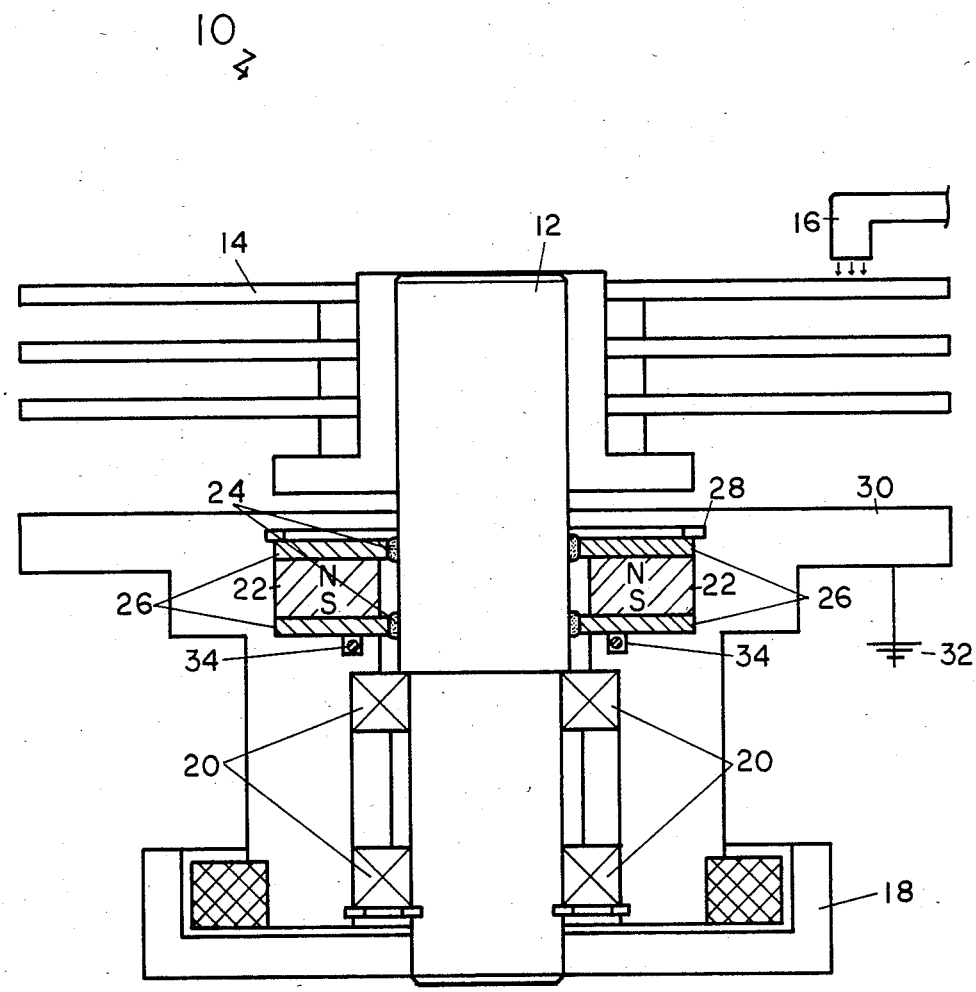

ELECTRICALLY CONDUCTIVE FERROFLUID COMPOSITIONS AND METHOD OF PREPARING AND USING SAME

BACKGROUND OF THE INVENTION

It is often necessary to conduct an electrical charge or current from a rotating to a stationary member or vice versa. There also might be a further requirement that the charge or current be transported with the two sides being at unequal pressure. The conventional way to solve this problem is to use a combination of slip ring and a seal such as a ferrofluid or mechanical seal. The slip ring may use mercury between the rotating and stationary member or simply a low resistance spring-loaded mechanical contact such as gold alloy or silver graphite etc. against the rotating member.

Two industries where such devices are used are the semiconductor and computer industry. In the semiconductor industry, for example, the RF or DC sputtering performed under vacuum requires that the current be carried out from the atmosphere to the vacuum side, and from the stationary element (atmosphere side) to rotating (shaft) element (vacuum side). In the computer industry, the static charge built up at the disk in a rotating spindle needs to be grounded in addition to sealing hermetically the disk cavity for contamination-free operation.

The current ferrofluids used in ferrofluid seal apparatus are nonconducting with resistivity in the range of about $10^{10}$ ohm-cm or more. Thus when these fluids are used as ferrofluid sealants, they provide the ferrofluid sealing function, but do not conduct charge or current from the housing (stationary) to the rotating shaft or vice versa. Ferrofluids or magnetic colloids are liquids with magnetic properties in which ferromagnetic materials are colloidally suspended. These colloids are responsive to external magnetic fields. The response depends generally on the concentration and the type of ferromagnetic particles and also a function of shape and size of the particles.

A very stable magnetic colloid in a high magnetic field gradient requires very small ferromagnetic particles, typically less than 100 Å diameter and coated with one or several layers of surfactants to prevent agglomeration in a particular liquid carrier. Ferrofluids are widely known and used and typical compositions are described, for example in U.S. Pat. No. 3,700,595, issued Oct. 24, 1972; U.S. Pat. No. 3,764,540, issued Oct. 9, 1973; and U.S. Pat. No. 4,430,239, issued Feb. 7, 1984. A particular process for preparing ferrofluid compositions are described in U.S. Pat. No. 3,917,538, issued Nov. 4, 1975; and U.S. Pat. No. 4,381,244, issued Apr. 26, 1983; U.S. Pat. No. 4,485,024, issued Nov. 27, 1984 and U.S. Pat. No. 4,356,098, issued Oct. 26, 1982 which describe various other techniques for synthesis of magnetic liquids.

In recent years such magnetic colloids or ferrofluids have been used for sealing in ferrofluid seals, as damping liquids in inertia dampers, as heat transfer liquids in the voice coil of loudspeakers, as bearing liquids and lubricants, and for domain detection, oil prospecting, and other applications.

The non-aqueous or oil based ferrofluids thus far produced exhibit very high resistivities, in the range of $10^{10}$ ohm-cm, and are basically considered dielectrics. Ferrofluids have been limited in applications where transport of electrical charge is required along with the sealing or other functions. It would be most desirable that besides sealing, damping and other properties, the magnetic colloids offer also improved electrical conductivity, particularly for use in computer and semiconductor seal application, such as computer disk drive; where the static charge accumulated at the disk can be grounded through a conductive ferrofluid and RF or DC Sputtering; where power can be fed from a stationary to a rotating member or vice versa.

SUMMARY OF THE INVENTION

The present invention relates to electrically conductive ferrofluid compositions and to the method of preparing and using such electrically conductive ferrofluid compositions and to ferrofluid seal apparatus employing such ferrofluids. In particular, the invention concerns electrically conductive ferrofluid seal compositions used in a seal apparatus, which seal apparatus is useful as an exclusion computer disk drive seal and as a pressure capacity-type seal for use in the semiconductive industry in sputtering applications.

The electrically conductive ferrofluid compositions of the invention comprise a liquid carrier having a colloidal suspension of finely divided magnetic particles in an amount sufficient to impart the desired magnetic properties to the ferrofluid composition and also finely divided electrically conductive particles in an amount sufficient to impart improved electrical conductivity to the resulting ferrofluid composition. The ferrofluid composition also includes a surface active-type dispersing agent in an effective amount to disperse and stabilize the magnetic and carbon particles. More particularly, the ferrofluid composition comprises a non-aqueous, generally a hydrocarbon or oil-type based liquid carrier and single domain ferromagnetic finely divided particles in combination with electrically conductive finely divided carbon particles with the particles being dispersed by a dispersing agent which disperses and stabilizes the dispersed particles in the liquid carrier. The ferrofluid composition generally has an electrical conductivity of volume resistivity of about $10^3$ ohm-cm or less, such as about 100 ohm-cm at 25° C. or less.

The electrically conductive ferrofluid compositions are prepared by adding an electrically conductive effective amount of the electrically conductive particles to a nonconductive ferrofluid composition and optionally employing additional dispersing agent and then dispersing the carbon particles in the ferrofluid composition, such as by grinding the composition to provide a stable colloidal electrically conductive composition.

The carbon particles may be essentially dispersed using a dispersing agent in a liquid carrier of the same or different, but compatible carrier as used in the nonconductive ferrofluid composition. The dispersing agent should be controlled in amount and may be the same or a different, but compatible dispersing agent as in the nonconductive ferrofluid composition. Also the electrically conductive ferrofluid composition can be prepared by adding carbon particles in the preparation of the ferrofluid composition.

The electrically conductive ferrofluid compositions so prepared are usefully employed in place of nonconductive ferrofluid compositions where the buildup of static charge is detrimental or undesirable where a ferrofluid of an electrically conductive nature is required or useful, such as the use of such electrically conductive ferrofluid compositions in single or multiple-pole piece seal apparatus in order to provide or help to provide an electrical pathway to ground for accumulated static charges in the operation of the shaft about which the ferrofluid seal apparatus is employed to provide a ferrofluid seal. The electrically conductive ferrofluid compositions thus contain the magnetic properties as desired of a ferrofluid composition, but also have the additional property of being more electrically conductive.

The liquid carrier employed in preparing the ferrofluid composition of the invention may be any type of a liquid including water or hydrocarbons, esters, fluorocarbons, silicones, mineral oils, polyphenyl ethers, polyglycols, fluorosilicones, and various other liquids, such as for example an ester based oil liquid or a polyalphaolefin base. Typically the liquid carriers are stable, nonvolatile liquids. The liquid carriers employed may contain or have various additives, such as stabilizers, antioxidants, corrosion inhibitors, viscosity index additives, or minor amounts of other additives to improve the selected quality or properties of the composition.

The magnetic particles employed in the ferrofluid compositions may be those magnetic type of particles commonly employed in preparing ferrofluid compositions and typically comprise finely divided single domain particles of ferromagnetic materials, such as, but not to be limited to magnetite, ferrites, iron, nickel, cobalt, metal carbides or metal oxides, metal alloys, and other finely divided material which have or can be made to have magnetic properties when dispersed in a liquid carrier. One typical and preferred ferromagnetic particle comprises magnetite particles. The ferromagnetic particles employed are finely divided and are generally less than 1000 angstroms, but more typically less than 500 angstroms, such as for example about 20 to 300 angstroms in single domain particles.

Any form of carbon material can be used for electrical conduction such as: diamond, graphite, carbon black, coke, chars and activated carbons, fibrous carbon, vitreous carbon, pypolytic graphite as long as the particle size is in the range of 20–5000 Å as individual particles and aggregate sizes up to 1 mm. It has been found that the best electrical conductivity is obtained by dispersing electrically conductive carbon black particles having diameters about 50 to 300 Å or surface area ($N_2SA$) of about 100–3000 meters 2/gr. The carbon black particles may be produced from any well known technological process such as: channel process, oil furnace process, thermal process etc. It has been found that the best electrical conductivity is obtained by carbon black particles produced by the furnace process. These carbon particles have a dry electrical resistivity of $10^{+2}$–$10^{-2}$ ohm-cm.

The carbon particles and the magnetic particles of the composition are dispersed and stabilized through the employing of a dispersing agent, such as a surface active agent or a surfactant. The dispersing agent used to stabilize the magnetic and the carbon particles in any particular given liquid carrier may be of various types, such as cationic, anionic or nonionic surface active agent or combinations thereof depending upon the liquid carrier and the dispersion desired. The particular dispersing agent used to disperse the electrically conductive carbon particles in a ferrofluid composition may be the same as the dispersing agent or surfactant used to disperse the magnetic particles in the ferrofluid composition or may be a different dispersing agent; that is, one which is able to disperse the electrically conductive carbon particles, but in any event different dispersing agent should be compatible with the constituents employed in the ferrofluid composition, so as to provide for an overall stable colloidal ferrofluid composition.

Generally, the ratio of surfactant for electrically conductive carbon particles is about 0.01 to 1 to 20 to 1 by weight. The quantity of the surfactant calculated from this ratio applies only to the surfactant used to disperse the conductive carbon particles in the ferrofluid composition. Generally, the ratio of the dispersing agent to the magnetic particles in the ferrofluid composition ranges from about 0.5 to 1 to 20 to 1 by weight. Also, the magnetic particles are present in the ferrofluid composition in an amount ranging from about 5 to 20 percent by weight of the liquid carrier, while the electrically conductive carbon particles generally range from about 1 to 25 percent by weight of the ferrofluid composition, for example, such as from about 5 to 18 percent by weight.

The electrically conductive ferrofluid compositions prepared in accordance with the invention have varying saturation magnetization values and typically range from about 25 gauss to 900 gauss, for example 100 to 450 gauss and may have an electrical resistivity as low as 5 ohms-centimeter at 27° C. It has been found that the electrical resistivity of the ferrofluid composition of the invention generally decrease with increase in temperature and that such ferrofluid compositions have thixotropic rather than newtonian properties.

The surfactants employed may comprise a wide variety of surfactants or may for example comprise a number of fatty acids, such as oleic acids, sulfonates, such as petroleum sulfonates, phosphate esters, such as alcohol esters of ethoxylated phosphate esters, which may be used alone or in combination in preparing the electrically conductive ferrofluids of the invention. The amount of surfactant employed in dispersing the electrically conductive carbon particles should be controlled, since it may be necessary for the electrically conductive carbon particles to have some surface exposure to enhance conductive properties. Thus the total surfactant employed in the ferrofluid should not be so high as to prevent the dispersed carbon particles to come within electrically conductive distance of each other.

The electrical conductivity of the ferrofluid composition depends on the grade of the carbon black employed as the carbon particles and the quantity of the carbon particles in the ferrofluid composition. The resistivity and viscosity of the ferrofluid composition are an exponential function of the loading density of the carbon black, but generally the amount of electrically conductive carbon black ranges from between 1 and 25 percent.

A preferred electrically conductive ferrofluid composition would comprise a low vapor pressure hydrocarbon or ester oil as a liquid-type carrier and the dispersion of about 8 to 12 percent of a furnace process derived carbon black particles in a range of about 100 to 150 angstroms with about 4 to 10 percent by weight of magnetite particles as the magnetic particles and having a particle range of about 20 to 250 angstroms or more particularly generally in the same range as the carbon particles with both the magnetic and electrical properties of the resulting ferrofluid depending on the volume loading of the magnetite and carbon particles in the composition. For a colloidal ferrofluid composition to have electrical conductivity the size of the carbon particles must be in the submicron range, while the factors such as mixing time or dispersion agents may also affect the resulting electrical conductivity. The dispersing agent employed typically in the preferred situation may be a phosphate ester surfactant, such as a aliphatic, e.g. long chain alcohol phosphate ester surfactant.

It has been found that there is a relationship between the dispersion time for dispersing electrically conductive carbon particles and the electrical resistivity of the resulting ferrofluid composition. While the electrical resistivity of the composition varies with the amount of carbon particle loading, the dispersion time usually requires a mixing time of from 5 minutes to 4 hours or more depending upon the viscosity of the magnetic colloid and the type of the electrically conductive carbon particles being employed. A variety of equipment and techniques may be used to disperse the electrically conductive carbon particles in the composition, such as for example, the employment of a steel ball mill to a heavy duty mixer or dispersion mill.

While not wishing to be bound by any theory of operation, it is believed that very small chains of aggregates of the carbon particles are responsible for electrical conductivity in a given dispersion along with the width of the gaps between the aggregate chains. Our theory indicates that these gaps between the chains must be limited to the order of several millimicrons if electrical conductivity is to occur through the flow of electrons. The electrons apparently can jump gaps of this order through a phenomonen known as the tunnel affect; however, when the gaps become larger electron flow tends to break down and the system finally becomes relatively nonconductive or absolutely nonconductive.

The loading density of electrically conductive carbon black particles and the quality of dispersion play a roll in providing the desired value of electrical conductivity for a given ferrofluid composition for low mixing times and where dispersion is poor and the aggregates to aggregate distance is large, the resulting compositions have low electrical conductivity. After maximum electrical conductivity is achieved, additional mixing time begins to break up the aggregates and electrical conductivities slowly decreases. Thus, the time of mixing should be optimized for a particular magnetic colloid or a ferrofluid composition, so that adequate and full dispersion is achieved without the full breakdown of the aggregates of the electrically conductive particles. Electrically conductive ferrofluid compositions containing carbon black particles varies in electrical conductivity as a function of temperature, but generally with the electrical conductivity increasing as the temperature increases. While in addition, the electrical conductivity imparted by the carbon black particles is also a function of the degree of mechanical stress applied to the ferrofluid composition.

The electrically conductive ferrofluid compositions are useful for example in ferrofluid seal apparatus. For example, in a rotating computer disk drive spindle static charge is produced at the disk and which charge buildup can lead to a spark between the disk and the magnetic head located within 15 microinches of the disk. The static spark may locally damage the alignment of media particles and the disk resulting in the loss or damage of information. However, by grounding the computer disk drive spindle it is possible to avoid sparking. In the past the spindle has been grounded by the use of a spring-loaded, low resistant 5 to 50 ohm button, such as a button made of silver graphite. However, the button wears with time and also produces undesirable noise and resonances. In addition to conducting a static charge produced at the disk, the cavity in which the computer disk is rotating must also be sealed from contaminates generated within the spindle, such as bearing lubricant vapors and metal particles and so forth. A ferrofluid exclusion seal is now and has become an industry standard for hermetic sealing of the computer disk drive spindles.

A conducting seal for disk drive application may be a standard exclusion seal consisting of an axially polarized magnet and two magnetically permeable pole pieces. The magnetic circuit is completed through the magnetically permeable spindle shaft. An electrically conducting ferrofluid may be retained in the radial gap by the focussed magnetic field and provides the functions of both sealing and electrical conduction. The pole piece widths and the radial gap are selected to optimize the magnetic field distribution (and thus the pressure capacity of the seal) and the electrical resistance. A typical electrically conducting ferrofluid seal may use ferrofluid with magnetization in the range of 50 to 300 gauss and viscosity up to 5,000 cp @ 27° C. The radial gap may vary from 0.004 to 0.010 inch, and the pole piece widths may vary from 0.030 to 0.100 inch. One or both pole pieces may be charged with conducting ferrofluid. Additionally, single pole piece exclusion seal can be made conducting with the use of a conducting ferrofluid, as well as self activating ferrofluid seals and a multiple-stage pressure capacity ferrofluid seal.

Ferrofluid is captured in an annular ring between the rotating shaft and pole piece. The electrical resistance of the fluid is:

$$R = \rho \frac{\delta}{\pi D Lt}$$

Where
$R$ = Resistance of conducting ferrofluid (ohm)
$\rho$ = Resistivity of conducting ferrofluid (ohm-cm)
$\delta$ = Radial gap (cm)
$D$ = Shaft diameter (cm)
$Lt$ = Pole Piece width (cm)

The resistivity of conducting ferrofluid is about $4 \times 10^3$ ohm-cm. The upper limit of radial gap, where the fluid is still conducting, is about (0.025 cm).

Thus, if a conventional exclusion seal is used, employing a conducting instead of a standard ferrofluid, with the parameters:
$\delta$ = 0.020 cm
$D$ = 1.27 cm
$Lt$ = 0.102 cm
We obtain:

$$R = 4 \times 10^3 \times \frac{0.020}{3.14 \times 1.27 \times 0.102}$$

$R$ = 200 ohm
If both pole pieces are charged with ferrofluid:

$$\frac{1}{R} = \frac{1}{R_1} + \frac{1}{R_2} = 2/R_1 \text{ for } R_1 = R_2 \text{ or } R = R_{\frac{1}{2}}$$

$R$ = 100 ohm i.e. the resistance becomes half of the original value.

For the three stage seal with stages being of equal width: $R = R_{\frac{1}{3}}$ or $R = 33.3$ ohm i.e. the resistance becomes one third of the original value. Thus, as more stages are added into the seal, the total resistance of the ferrofluid path becomes smaller. This is one way to control the resistance of the conducting seal.

The other parameter that can be used to control the resistance is the pole piece width. The larger the pole piece width, the smaller the resistance.

Using the above example, we have R=200 ohm for Lt=0.102 cm. This leads to R=100 ohm for Lt=0.204 cm and if both pole pieces are charged, each being of width 0.204 cm, then R=50 ohm. Finally the resistance is proportional to the radial gap.

We have in the above example:

R=200 ohm for δ=0.020 cm, this leads to R=100 ohm for δ=0.010 cm and for two stages being charged R=50 ohm, with δ=0.010 cm.

Thus, with the use of the parameters, i.e., Lt and the number of stages, a conducting ferrofluid seal employing electrically conductive ferrofluid can be designed with any resistance.

A conducting seal not only requires the use of a conducting ferrofluid, but also its mechanical structure should be such that the charge is efficiently transported to the ground. Thus, the mounting of the seal is paramount to its function. The current exclusion seals use adhesives and mounting arrangements that offer high resistance to ground.

An electrically conducting ferrofluid seal for disk drive application provides the conventional sealing function and the conduction of electrical charge. The electrical properties of the seal thus can be used to eliminate the grounding silver graphite button in spindles. The electrical resistance of the seal can be controlled by the mechanical parameters such as the pole piece width, radial gap and number of stages. A conducting ferrofluid is used as the ferrofluid in the seal. The resistivity, which finally determines the electrical resistance of the seal, is in the range of $10^3$ ohm-cm or less. A properly designed seal may have resistance of about 50 ohm which is in the range of the value for the slip ring. Various mounting configurations may be used for the seal which provide a low resistance path to the ground for the discharge.

The invention will be described for the purposes of illustration only in connection with certain embodiments; however, it is recognized that various changes, additions, modifications, and improvements may be made to these illustrative embodiments by those persons skilled in the art all falling within the spirit and scope of the invention.

BRIEF DESCRIPTION OF THE DRAWING

The drawing is a shematic, illustrated sectional view of a computer disk drive having an electrically ferrofluid exclusion seal.

DESCRIPTION OF THE EMBODIMENTS

EXAMPLE 1

An ester base (Mobil Chemical Co. DB-51) oil magnetic liquid with $Fe_3O_4$ as magnetic particles, and oleic acid and Pegafac (Glycol Chemicals, Inc.) CS710 (a phosphate ester of an ethoxylated alcohol) as surfactants, is used as a carrier for an electrically conducting magnetic colloid The magnetic liquid or ferrofluid has the saturation magnetization value of 300 gauss, a viscosity value of 70 cp @ 27° C. and an electrical resistivity value of $10^{10}$ ohm-cm. A 15 ml of CS 710 is dissolved in 100 ml of the ester base carrier at 80° C. for 60 minutes under agitation to assure a total dispersion. 10 gm of Conductex 40-220 carbon particles (Columbia Chemicals Company) are added to the magnetic carrier and mixed throughly using a heavy duty mixer (Banbury Type) for 30 minutes. The electrically conducting colloid thus prepared has 300 gauss saturation magnetization and an electrical resistivity of 70 ohm-cm. The colloid shows a thixotropic behavior.

EXAMPLE 2

A polyalphaolefin base (Emery Industries 3004) magnetic liquid with nickel-Zn ferrites ($NiO_3$ Zn 0.7 $Oe_2O_3$) magnetic particles, and Petronate 25H (Witco Chemical Corp.) (a calcium petroleum sulfonate) as a surfactant is used as a liquid carrier for an electrically conductive magnetic colloid. The starting magnetic fluid has 250 gauss saturation magnetization and 55 cp viscosity and $10^{10}$ ohm-cm electrical resistivity at 27° C.

6 ml of the Petronate 25H surfactant is dissolved in 100 ml of magentic fluid at 100° C. for 60 minutes. 12 grams of Black Pearls (Cabot Corporation) 2000 carbon black is added to the magnetic liquid and mixed for 60 minutes using a twinscrew extruder.

The electrically conducting magnetic ferrofluid thus prepared has 250 gauss saturation magnetization and an electrical resistivity of 30 ohm-cm. The colloid shows a thixotropic behavior.

EXAMPLE 3

The effect of the weight percent of carbon black on viscosity and electrical conductivity of an electrically conducting magnetic colloid composition at 27° C. is shown in Table 1.

TABLE 1

| PERCENT OF CARBON BLACK WEIGHT PERCENT | INITIAL VISCOSITY 200 cp | INITIAL VISCOSITY 70 cp | INITIAL VISCOSITY 45 cp | COLLOID ELECTRICAL CONDUCTIVITY [Ωcm] |
|---|---|---|---|---|
| 1 | 220 | 80 | 55 | — |
| 2 | 250 | 110 | 65 | — |
| 3 | 350 | 195 | 72 | — |
| 4 | 550 | 210 | 105 | more than 100,000 |
| 5 | 1,060 | 300 | 115 | more than 100,000 |
| 6 | 5,000 | 610 | 300 | 20,000 |
| 7 | 30,000 | 1,100 | 500 | 800 |
| 8 | more than 100,000 | 5,000 | 1,000 | 420 |
| 9 | — | 10,000 | 2,000 | 150 |
| 10 | — | more than 100,000 | 10,000 | 60 |
| 11 | — | — | 50,000 | 55 |
| 12 | — | — | more than 100,000 | 40 |

EXAMPLE 4

The effect of dispersion time on volume resistivity of an electrically conductive magnetic colloid composition at 27° C. is shown in Table 2.

TABLE 2

| DISPERSING TIME [h] | VOLUME RESISTIVITY [Ωcm] | |
| --- | --- | --- |
| | 10 PERCENT CARBON BLACK | 12 PERCENT CARBON BLACK |
| 0.2 | 80 | 50 |
| 0.5 | 73 | 45 |
| 0.8 | 64 | 35 |
| 1 | 62 | 28 |
| 2 | 62 | 19 |
| 3 | 63 | 19 |
| 4 | 63 | 19 |
| 6 | 64 | 19.5 |
| 10 | 65 | 22 |
| 14 | 71 | 25 |

The ferrofluid composition of Table 1 and 2 have a diester oil liquid carrier, 5 percent by weight magnetite, and employ a phosphate ester dispersing agent (see U.S. Pat. No. 4,430,239). The ferrofluid composition of Table 2 is the ferrofluid composition of Table 1 having an initial viscosity of 80 cps.

The drawing is a schematic sectional illustration of a computer disk drive 10 containing a computer disk drive magnetic shaft 12, a computer disk 14 mounted on the shaft 12 and a magnetic head 16 to read such computer disk 14 and a motor 18 for driving the spindle shaft with the shaft supported through bearings, such as ball bearings 20. A ferrofluid dual pole piece exclusion seal is positioned between the bearings and the environment in which the computer disk 14 and magnetic head 16 are located in order to provide a ferrofluid seal and to prevent contaminants from entering the environment on which the magnetic head 16 computer disk 14 operate. The ferrofluid seal apparatus comprises a axially polarized magent 22 with dual pole pieces 26 on either side of the magnet, the pole pieces extending into a close, noncontacting relationship at one end with the surface of the shaft 12 to form a defined radial gap, and within the radial gap there is an electrically conductive ferrofluid 24 of the invention. The magnet 22 and pole pieces 26 are retained in position through a snap ring 28 which is electrically conductive and pole piece 26 sealed by O-ring 34 to housing 30. Typically the pole pieces are both magnetically and electrically conductive and are housed in a nonmagnetically permeable housing 30, such as of aluminum or stainless steel.

In the embodiment illustrated a static charge built up on the rapidly rotating spindle shaft 12 is conducted away from the shaft surface through the electrically conductive ferrofluid 24 through the pole pieces 26 and snap ring 28 into the electrically conductive housing 30 and to ground 32. The electrically conductive ferrofluid structure thus provides for the conducting of the static charge to ground through the stationary member rather than the rotating shaft member and thus eliminates the need for a slip ring; that is a ball and spring-loaded brush in contact with the rotating shaft to conduct built up charge from the shaft when a conventional nonelectrically conductive or high resistance ferrofluid is employed in the gaps.

For the purposes of illustration the electrically conductive ferrofluid has been shown being conducted to ground through a pole piece or snap ring in the housing; however, it is recognized and part of the invention that other electrically conductive means may be employed in contact with the electrically conductive ferrofluid and to aid in conducting the accumulated static charge passing through the electrically conductive ferrofluid to the ground. For example, conductive paint may be employed to provide an electrically conductive path through the accumulated static charge to ground. Thus, the employment of conductive paint, such as silver graphite-type paint employed in integrated circuits avoids the necessity of having conductive pole pieces or conductive magnets. Often the magnets employed are nonconductive, while the pole pieces are conductive. The electrically conductive ferrofluids may be employed with a single, double or multiple-stage ferrofluid seal apparatus, which ferrofluid seal apparatus employing a flat washer-type axial, radially polarized washers either on the inside or outside diameter. Thus, for example, silver or electrically conductive paint may be placed on the inside or outside diamter of a flat washer-type magnet employed as an exclusion seal in order to provide an effective lead to conduct the static charge to ground.

What is claimed is:

1. An electrically conductive ferrofluid composition, which composition consists essentially of:
    (a) a nonvolatile liquid carrier;
    (b) colloidal-size single domain magnetic particles in an amount sufficient to provide magnetic properties to the ferrofluid composition;
    (c) colloidal-size electrically conductive carbon particles in an amount sufficient to provide electrical conductive properties to the ferrofluid composition; and
    (d) a dispersing agent in an amount sufficient to disperse and stabilize the colloidal magnetic and electrically conductive carbon particles in the liquid carrier.

2. The composition of claim 1 wherein the liquid carrier is a hydrocarbon oil or ester base liquid carrier.

3. The composition of claim 1 wherein the magnetic particles comprise single domain ferromagnetic particles having a diameter of less than about 1000 Å.

4. The composition of claim 1 wherein the ratio of dispersing agent to magnetic particles ranges from about 0.5/1 to 20/1 by weight.

5. The composition of claim 1 wherein the ratio of dispersing agent to carbon particles ranges from about 0.01/1 to 20/1 by weight.

6. The composition of claim 1 wherein the composition has an electrical resistivity of about $10^3$ ohm-cm or less at 27° C.

7. The composition of claim 1 wherein the carbon particles or agglomerates range in size from about 20 Å to 1 millimeter.

8. The composition of claim 1 wherein the individual carbon particles and the magnetic particles range in size from about 20 to 300 Å.

9. The composition of claim 1 wherein the carbon particles are present in an amount of from about 1 to 25 percent by weight of the composition.

10. The composition of claim 1 wherein the carbon particles have a surface area of about 100–3000 meters square per gram.

11. The composition of claim 1 wherein the carbon particles comprise carbon black particles produced by a furnace process and which have a dry electrical resistivity of about $10^2$ to $10^{-2}$ ohm-cm.

12. The composition of claim 1 characterized in that electrical resistivity of the composition decreases with an increase in temperature.

13. The composition of claim 1 wherein the dispersing agent is an anionic or cationic surfactant.

14. The electrically conductive ferrofluid composition, which composition consists essentially of:
(a) a nonvolatile liquid carrier;
(b) finely divided single domain ferromgnetic particles having an average particle size of from about 20 to 300 Å;
(c) electrically conductive carbon particles in an amount of from about 1 to 25 percent by weight of the composition, the undivided carbon particles having a particle size of 20 to 300 Å and an aggregate particle size of up to 1 millimeter;
(d) a surface active dispersing agent to disperse and stabilize the magnetic and carbon particles, the ratio of the dispersing agent to the carbon particles ranges from about 0.01/1 to 20/1 by weight; and
(e) the composition characterized by thixotropic behavior and having an electrical resistivity of about $10^3$ ohm-cm or less.

15. The composition of claim 14 wherein the carbon particles have a surface area of about 100–3000 meter square per gram and have a dry electrical resistivity of about $10^{+2}$ to $10^{-2}$ ohm-cm.

16. The composition of claim 14 wherein the carbon particles are carbon black particles produced by a furnace process.

17. A method of preparing an electrically conductive ferrofluid composition, which method comprises:
(a) dispersing an electrically conductive amount of electrically conductive carbon black particles having an undivided particle size of less than about 5000 Å and aggregates of less than about 1 millimeter with a surface active dispersing agent in a liquid carrier to obtain a carbon black-containing liquid carrier; and
(b) mixing the carbon black particles containing the liquid carrier with a ferrofluid composition comprising a compatible liquid carrier, a compatible dispersing agent and finely divided ferromagnetic particles.

18. The method of claim 17 which includes dispersing the carbon particles to provide individual carbon particles of about 20 to 300 Å particle size.

19. The method of claim 17 wherein the carbon particles comprise furnace process carbon black particles having a surface area of about 100 to 3000 meters square per gram.

20. The method of claim 17 which includes employing a compatible, but different dispersing agent to disperse the carbon black particles than the dispersing agent used to disperse the magnetic particles in the ferrofluid composition.

21. The composition of claim 1 wherein the dispersing agent is selected from the group consisting of fatty acids, petroleum sulfonates and phosphate esters.

22. The composition of claim 1 wherein the magnetic particles are magnetite particles.

23. The composition of claim 1 wherein the liquid carrier comprises an ester oil or a polyalphaolefin.

24. An electrically conductive ferrofluid composition having an electrical resistivity of about $10^3$ ohm-cm or less, which composition consists essentially of:
(a) a nonvolatile liquid carrier;
(b) single domain magnetite particles in an amount of from about 5 to 20 weight percent of the composition and having a particle size of about 20 to 300 Å;
(c) carbon black particles derived from a furnace process in an amount of from about 5 to 18 weight percent of the composition and having a particle size of about 20 to 300 Å; and
(d) a cationic or nonionic surface active dispersing agent in an amount to disperse and stabilize the magnetite and carbon particles.

* * * * *